Figure 1:
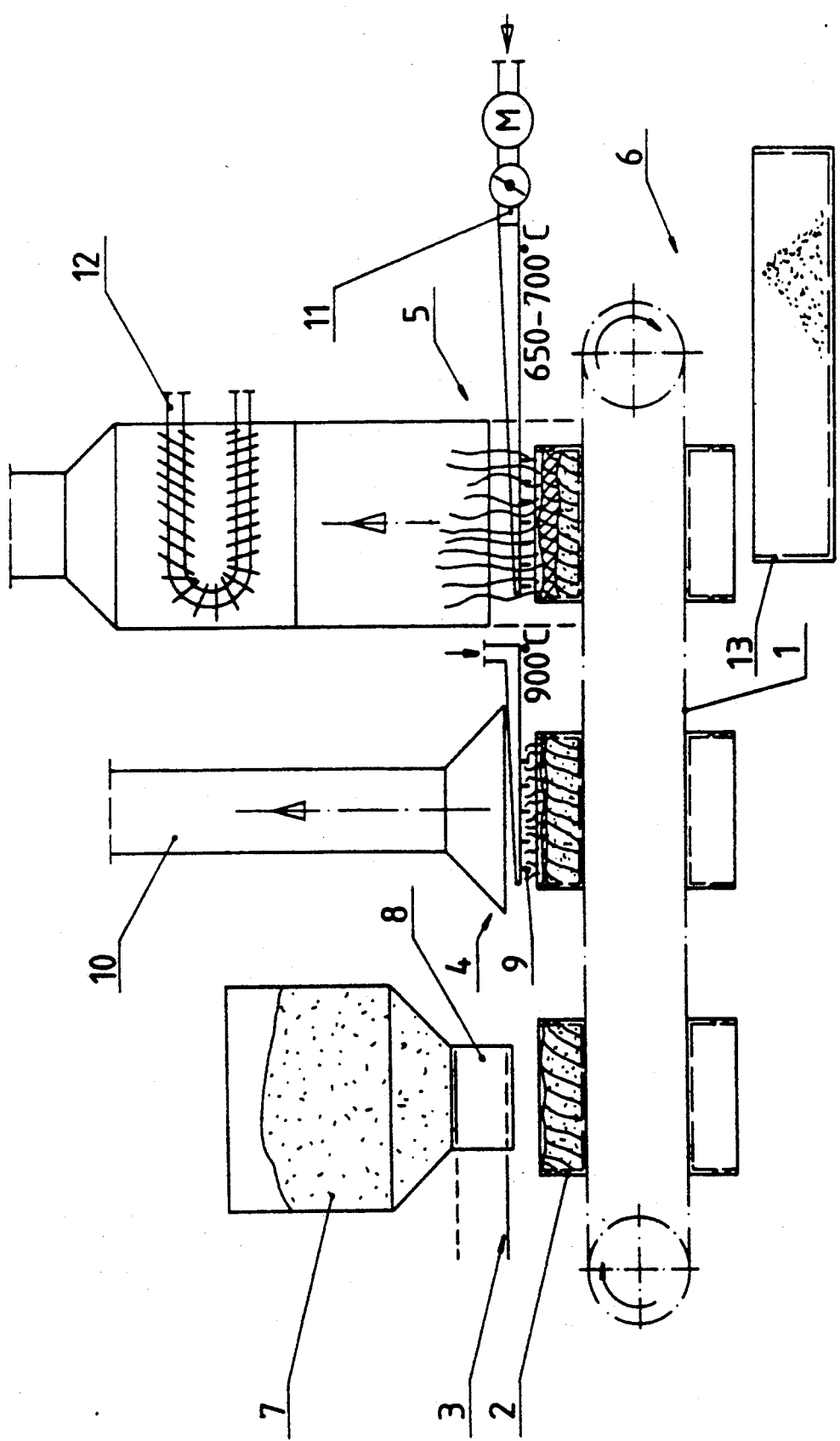

United States Patent [19]

Govenius

[11] Patent Number: 5,013,567
[45] Date of Patent: May 7, 1991

[54] METHOD FOR THE GENERATION OF SMOKE FOR USE IN SMOKE-CURING OF FOODS

[76] Inventor: Karl-Jan Govenius, Hämeenkatu 5, Lahti, Finland, SF-15110

[21] Appl. No.: 411,493

[22] PCT Filed: Apr. 25, 1988

[86] PCT No.: PCT/FI88/00061
§ 371 Date: Oct. 10, 1988
§ 102(e) Date: Oct. 10, 1988

[87] PCT Pub. No.: WO88/08251
PCT Pub. Date: Nov. 3, 1988

[30] Foreign Application Priority Data

Apr. 23, 1987 [FI] Finland .................................. 871777

[51] Int. Cl.5 ................................................ A23B 4/00
[52] U.S. Cl. ...................................... 426/314; 426/315
[58] Field of Search ............... 426/312, 314, 315, 650; 99/482

[56] References Cited

U.S. PATENT DOCUMENTS 3,462,282 8/1969 Fessmann ............................ 426/314
4,270,464 6/1981 Kerres ................................ 426/314

Primary Examiner—George Yeung
Attorney, Agent, or Firm—Armstrong, Nikaido, Marmelstein, Kubovcik & Murray

[57] ABSTRACT

The invention concerns a method and an equipment for the generation of smoke for smoke-curing of goods. The smoke is generated by means of the top-burning technique, the smoke being recovered only when there is a layer of coals that has been produced from the burning of the fuel and that has a thickness of about 0.5 to 100 mm above the layer of fuel. The layer of coals acts as a regulator of the flow of the combustion air, whereby the burning can be made to take place at a temperature favorable in view of the formation of flavor agents and detrimental substances. The layer of coals also acts as a selective filter as it removes detrimental substances out of the smoke.

2 Claims, 2 Drawing Sheets

METHOD FOR THE GENERATION OF SMOKE FOR USE IN SMOKE-CURING OF FOODS

The present invention concerns a method and an equipment for the generation of smoke for use in smoke-curing of foods.

Smoke-curing is a method for improving the preservation and taste of foods, such as meat and fish. However, it has been noticed that it is a drawback of this process of treatment of foods that, when wood is burnt or heated for the generation of smoke, besides the desirable flavor agents detrimental substances are also produced, some of which have been noticed to be carcinogenic.

The problem caused by the detrimental substances has been realized for a relatively long time, and several modes of operation have been suggested for its elimination. As a rule, these prior-art methods are based on treatment of the smoke formed, by means of which said methods attempts are made to separate the flavor agents, on one hand, and the detrimental substances, on the other hand, out of the smoke to make fractions of their own.

One of these prior-art methods is based on cooling faces placed in the path of flow of the smoke, the detrimental substances contained in the smoke being supposed to be condensed on said faces. Such methods also operate in the desired way partially, for detrimental substances, such as tar, remain on the condensing faces out of the smoke. Other detrimental substances are also condensed, but the efficiency of the method is, however, deficient, for only part of the detrimental substances are removed and, on the other hand, desirable flavor agents are also lost, whereby, in order that the desired flavor could be obtained, the smoke-curing must be more intensive accordingly.

More advanced methods are based on the observation that the flavor agents contained in the smoke are, as a rule, soluble in water and that the detrimental substances are correspondingly, as a rule, insoluble in water. This observation has permitted a sort of "indirect" smoking. The desirable flavor agents have been separated from the smoke by means of water-washing. This water fraction has then been processed further by means of various physical and/or chemical methods so as to obtain a liquid smoke fraction as harmless as possible but rich in flavor. For the smoking effect, the foods to be smoke-cured have been soaked in said liquid smoke fraction to provide them with the flavor. Hereinafter the products may still be subjected to a gentle smoking in the traditional way so as to obtain the desired appearance. It can be considered that, as a result, a product is obtained that is, at least in principle, of substantially higher purity but that has been subjected to a complicated process of treatment.

Correspondingly, methods are also known in which the smoke fraction separated from the smoke by means of water-washing is processed far enough so that a dry product is obtained from it. This can then be used in the way of a spice to "smoke" a food. These dry methods may also be associated with gentle smoking in the conventional way to improve the appearance of the product.

In more recent research related to smoke-curing, attempts have been made to find solutions for the problem formed by the detrimental substances by going into the process of formation of smoke itself and to find means by which the formation of detrimental substances could already be eliminated while, however, not losing the flavor agents. In these studies it has been noticed that one factor essential in view of the composition of the smoke produced on burning of wood is the temperature of burning. It has been noticed that the optimum range consists of burning temperatures slightly below 700° C., i.e. about 650° C. to 700° C. Even in such a case, the formation of detrimental substances cannot be avoided completely, but it has been noticed that, within the burning-temperature range concerned, the ratio between flavor agents and detrimental substances is at the optimum. Said ratio of flavor agents and detrimental substances deteriorates steeply at temperatures above 700° C,, whereas at temperatures below 700° C. the deterioration of the ratio is less steep. (Potthast: *Advances in Food Research*, Vol. 29, 1984).

An essential factor in keeping the process of burning within said optimum range is correct dosage of the combustion air. In addition to the fact that the oxygen in air acts upon the combustion process proper, air is also directly involved in the secondary reactions after the combustion process, which said reactions have their role for the ultimate composition of the smoke gas.

This most recent approach for the reduction of the problem of detrimental substances is to be considered correct, and the advantages obtained by its means can be supplemented by means of older prior-art methods, such as condensation of smoke.

As a result of experiments carried out, it has been ascertained that the combustion process aimed at, and the processes following directly after it, are associated with circumstances whose correct control has an essential effect on the composition of the smoke obtained, as a low concentration of detrimental substances, on one hand, and as a high concentration of flavor agents, on the other hand.

It has been noticed that a starting point for an achievement of favorable results is the correct burning technique. In experiments it has come out that, in order that adequate results could be obtained, the generation of smoke must be based on so-called top-burning technique, i.e. on the use of a fire chamber in which an essential proportion of the combustion air is passed to the fuel through a burnt material layer formed on the top of the burning layer. Even though the use of the top-burning technique for the generation of smoke for smoke-curing can be considered as in itself known e.g., from the German Patent No. 867,947, this technique is associated with many circumstances by means of which the quality of the smoke can be affected and which have not been explained, e.g., in said publication.

The effect of the layer of coals on the burning process can be considered indirect, for when the topburning technique is used, the air entering into the burning zone must pass through the layer of coals formed on the surface of the fuel, in counterflow with the smoke that is leaving the burning zone. Thus, the layer of coals forms a flow limiter for the burning air, which said limiter has a direct effect on the intensity of burning, which has again its effect on the temperature of burning, and thereby on the composition of the smoke formed.

On the other hand, the layer of coals produced acts upon the smoke gases by means of its considerable absorption effect. It has been noticed that coal retains components from the smoke selectively, the selecting being obviously based on the molecular weights and polarity of the substances. According to the experiments, the selecting, however, takes place in the respect favorably that it has been noticed that compounds found to be detrimental, such as, e.g., benzo-a-pyrene, adhere to coal more reliably than phenol compounds to be classified as aromatic compounds.

In respect of these two processes, as regards the layer of coals formed on the surface of the fuel, the thickness of the layer has proved an essential factor, which said factor has obviously a complex effect in the overall process of generation of smoke.

Firstly, if the effect of the layer of coals is examined in view of the flow or the combustion air, it is clear that the effect of retarding the flow is increased with an increase in the layer of coals. When the fuel is kindled, there is no layer of coals, whereby there is no obstacle for the passage of the combustion air into the burning zone. At this stage, in view of the formation of smoke, the burning takes place wildly, i.e. mainly by blazing, whereby the burning temperature tends to become excessively high in view of the formation of the various compounds. In the smoke, a low level of flavor agents but an abundance of detrimental substances are produced. However, if the fuel and its particle size have been chosen correctly, which matter will be returned to later, the burning is evened relatively soon after kindling as a layer of coals starts being formed on the surface of the fuel.

Thus, in view of burning, it can be considered that an operative layer of coals has a certain minimum thickness in order that it should have a sufficient quieting effect on the wildness of burning. According to experiments, it has been noticed that this minimum thickness is about 0.5 mm, to some extent depending on the degree of coarseness of the fuel used. In order that the desired combustion process could be achieved, a coarse fuel may require that the layer of coals has a minimum thickness of about 2 mm. After the said layer of coals has been formed, the burning is evened and open flames disappear, whereby the burning goes on by smoldering. In visual observation, at this stage, it can also be noticed that the generation of smoke has increased clearly. On the basis of measurements carried out, it has also been possible to ascertain that at this stage the temperature in the burning zone is set within the range optimal in view of the composition of the smoke, i.e. at temperatures below 700° C., whereat, firstly, flavor agents are formed in a favorable ratio to the detrimental substances and, on the other hand, this ratio is not so strongly dependent on changes in temperature.

Likewise, it can be considered obvious that the thickness of the layer of coals has a clear effect on the efficiency of absorption of the layer. With an increased thickness of the layer the efficiency of absorption is also increased.

On the basis of experiments, it has, however, been concluded that the thickness of the layer of coals also has a certain maximum value in view of the desired effect. It has been noticed that, when the burning proceeds and when the layer of coals is thereby increased, the generation of smoke is reduced. Likewise, even based on sense perception, changes can be noticed in the composition of the smoke, which points at essential changes in the combustion process, and possibly also in the processes after the burning.

In view of the burning itself, it is obvious that, when the layer of coals increases, it constitutes such a great limiting factor for the flow of combustion air that the burning zone does not receive a sufficient amount of air to maintain burning in the desired way. The burning is retarded, and likewise the combustion temperature becomes lower. Thereat the amount of smoke obtained is restricted and, on the other hand, the composition of the smoke is changed in an unfavorable direction because of the excessively low burning temperature, i.e. the amount of flavor agents in relation to the amount of detrimental substances is lowered.

On the other hand, the thickness of the layer of coals can also be examined from the point of view of absorption. In view of absorption, in the efficiency of the layer of coals, a certain upper limit is also reached, after which a thicker layer of coals no longer increases the absorption of detrimental substances out of the smoke gases to a significant extent. The coal particles in the upper layers are filled and lose their efficiency. Thus, the absorption is limited only to a certain limit above the burning layer.

On the contrary, an excessively thick layer of coals may also have detrimental effects on the efficiency of cleaning of the smoke gases. The layer of coals forms quite an efficient reaction fact for the components in the smoke gases, for reactions with each other, on one hand, and for reactions with the oxygen of the air that flows through the layer of coals, on the other hand. As results of these reactions, substances essentially more harmful than those originally present in the smoke gas may also be formed and be liberated into the smoke gas. This afterreaction situation may also be affected essentially by the circumstance that the to-most coal layers in the filtering layer may start glowing in the flow of combustion air arriving onto them, in which case it is possible that an essential proportion of the flavor agents in the smoke is destroyed.

On the basis of experiments, the maximum thickness of a layer of coals placed on the burning zone has been estimated to be about 100 mm even though the fuel particle size may set the favorable limit of maximum thickness clearly lower, at about 20 to 50 mm. The latter value has been derived at, e.g.. with a fuel with excellent burning properties, the major part of whose particles were within the range of 125 to 2000 $\mu$m. With a clearly coarser fuel the maximum thickness of the layer of coals may also be somewhat higher than the above 100 mm.

Based on the circumstances stated above, a method for the generation of smoke for smoke-curing of foods has been provided, wherein the smoke is generated by burning wood or any other material charring substantially in a corresponding way by means of the top-burning technique and which said method is characterized in that the smoke formed during burning is passed to smoke-curing only when there is a layer of coals produced from the burning of the fuel and having a thickness of about 0.5 to 100 mm above the burning zone. Particularly advantageously, the smoke is recovered only when the thickness of the layer of coals is within the range of 2 to 50 mm.

The circumstance has also proved quite significant that the layer of coals formed during burning should be retained undisturbed during the stage of generation of the smoke to be utilized.

The method of the invention can be carried out either batchwise, which mode of operation is favorable for small-scale smoke-curing equipments. Of this batchwise mode of operation, it is also possible to provide a substantially continuous embodiment for smoke-curing equipments of industrial scale. Such a continuous embodiment, which, however, operates batchwise, is shown in the accompanying FIG. 1, which will be described in more detail below. A process fully continuous in respect of the process of burning can also be accomplished, but the stage of limiting the layer of coals is associated with processes whose taking into account will be described below in connection with the description of an equipment in accordance with FIG. 2.

The process of construction of the equipment to be used in the method is also associated with general circumstances which should be taken into account in the designing of the equipment. Firstly, it should be noted that if the fire chamber is made of a thermally highly conductive material, such as metal, the burning takes place more efficiently in the middle of the fire chamber than at the sides, i.e. obviously the loss of heat through the walls of the fire chamber has an effect on the process of burning. The phenomenon is accentuated if the horizontal cross-sectional form of the fire chamber is angular, in which case the burning takes place at the lowest rate in the corners of the chamber. An uneven prograss of the fire front in the vertical direction can be considered a detrimental facto- in view of the wood consumption and of the result, so that this matter ought to be taken into account in the planning of the device to be used. It would be advantageous that at least the vertical walls of the fire chamber are made of a material of low thermal conductivity, e.g of a ceramic material, or it would be advisable to provide them with thermal insulation. The problem of uneven burning can also be reduced by means of a little lateral flow of combustion air passed through the walls of the fire chamber, but this flow must not be so large that the process of generation of smoke is disturbed. A cautious heating of the wall of the fire chamber from outside also promotes uniform burning.

The problem of uneven burning can also be reduced by choosing the shape of the fire chamber such that its horizontal section is circular.

In the generation of large quantities of smoke, in the dimensioning of the equipment, the fact should also be taken into account that when the area of burning increases, owing to the opposite directions of flow of the combustion air and the smoke gases, flow-technical problems may arise, which disturb the carrying out of the process, unless the supply of air to the surface of the fuel has been secured adequately.

In the following Example 1, an experiment is described wherein the process of burning was examined by observing the burning temperature in a hill of fuel.

EXAMPLE 1

In the experiment, a smoke oven manufactured for housed use was used, whose outer dimensions were: width 400 mm, depth 450 mm, and height 700 mm. In the top portion of the smoke-curing space there was a short flue for the removal of the smoke. In the bottom part of the smoke oven, a fire chamber was provided, into which the fire box containing the fuel could be inserted through an opening provided in the wall of the oven and closable by means of a door. The fire box was open at the top but had closed walls. The cross-section dimensions of the box were 130×140 mm. The air needed for burning was passed into the fire chamber through the insertion opening for the fire box.

In the experiment, the fuel that was placed into the fire box consisted of sawdust sawn from beech. The particle size of the sawdust was as follows:

| Particle size (μm) | % |
|---|---|
| 4000 to 2000 | 1.1 |
| 2000 to 1000 | 9.4 |
| 1000 to 500 | 27.3 |
| 500 to 250 | 34.4 |
| 250 to 125 | 22.0 |
| 125 to 74 | 4.6 |
| <74 | 1.2 |

The density of said sawdust was about 270 kg/m$^3$, and its moisture content out of the wet weight was 7.2%. In the burning experiment, 200 g of sawdust was used (moist weight), which was poured into the fire box to make a hill. The height of the hill at the center was about 86 mm.

For the observation of the temperature, temperature detectors (NiCr-Ni thermoelement, type K, wire length 0.25 mm) had been placed at the center of the box at different levels. The heights of the detectors from the bottom of the box were:

| Detector | Height from bottom, mm |
|---|---|
| 1 | 85 |
| 2 | 69 |
| 3 | 51 |
| 4 | 40 |
| 5 | 24 |

At the beginning of the experiment, the sawdust hill was kindled over all of its face by means of a blow torch. After the open fire had disappeared from the surface of the hill, the box was placed into the fire chamber of the smoke oven. Adequate combustion air was supplied for burning through the box insertion door by means of natural draught.

In the experiment, the development of the temperature at the different measurement points was observed as a function of time as the smoldering front made progress in the sawdust.

The results of the experiment are given in the following Graph 1:

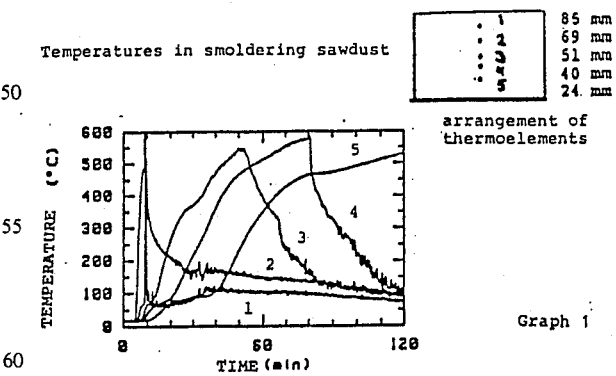

Graph 1

From the results it can be seen that after development of a smoldering burning proper (measurement point 2), the temperature in the burning zone rose to a value slightly above 500° C., and in the following measurement points to a somewhat higher level. The peak value in point 4 was reached in about 80 min. However, at this stage the generation of smoke already started decreasing, and decreased further even though the temperature at point was still rising, though at a slower rate. It can be considered that an obvious reason for the retardation was the flow resistance produced by the layer of coals formed on the surface of the hill, which retarded the penetration of the combustion air into the burning layer.

By means of said device and by means of the burning technique described above, test smoke-curings were also carried out, wherein fish was smoke-cured. Out of the smoke-cured products, the content of benzo-a-pyrene was determined, which is indicative of detrimental substances. Several tests were carried out by varying the smoke-curing conditions to some extent, i.e. by choosing the burning stage at which the fire box was pushed into the smoke oven. In most of the samples the concentration of benzo-a-pyrene was below the detecting limit, whereas the highest concentration was 0.05 µg/kg.

For the sake of comparison, a smoke-curing test was also carried out in which the fuel burnt in freely flowing air. In this smoke-curing the benzo-a-pyrene concentration in the product was measured as 0.5 µg/kg.

Figure 2:
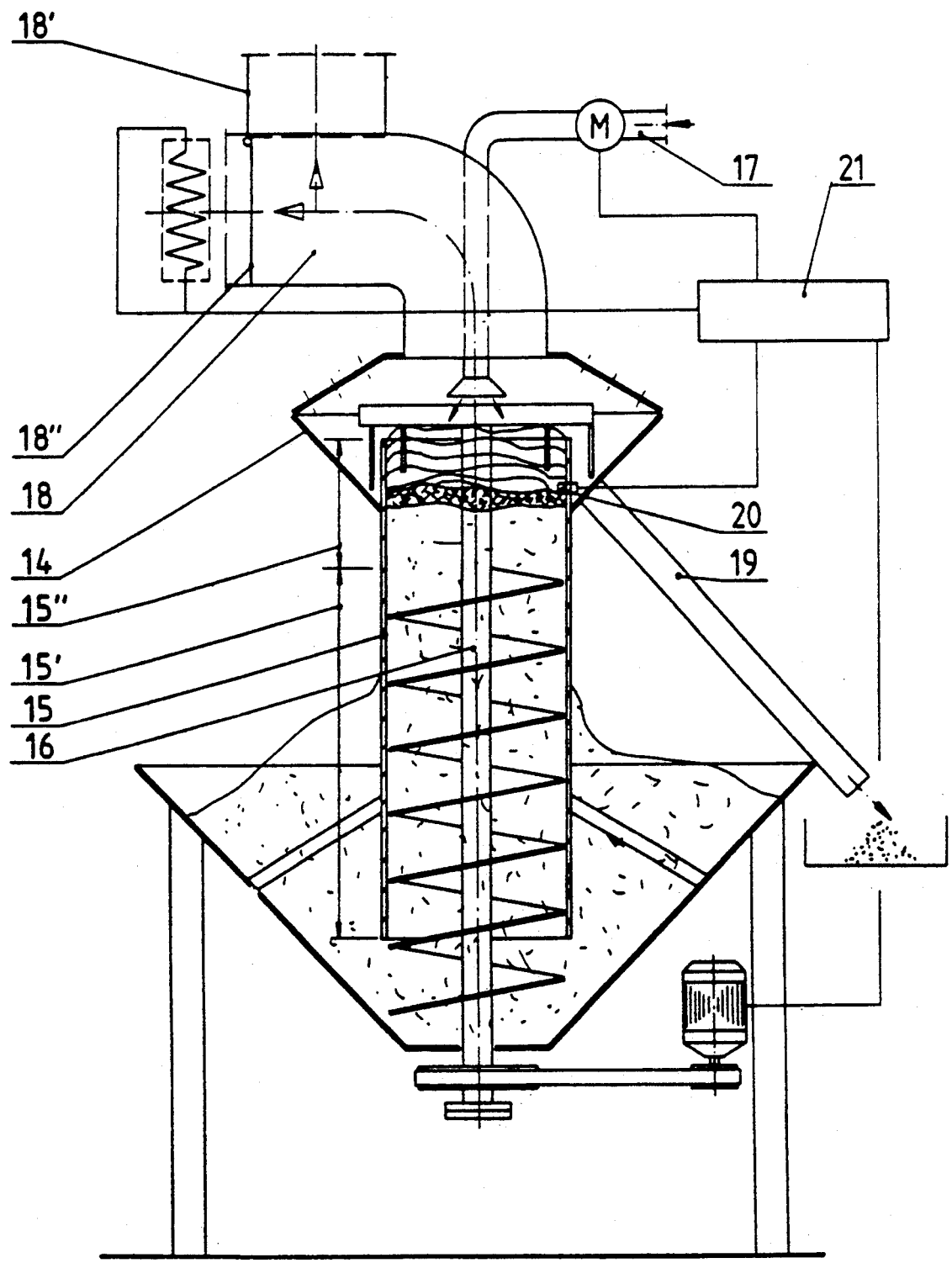

The equipments in accordance with the invention will be described with the aid of the accompanying drawing, wherein FIG. 1 is an illustration of principle of an equipment that operates batchwise, and FIG. 2 shows a second, alternative equipment, likewise as an illustration of principle.

FIG. 1 is a schematical illustration of an equipment for the generation of smoke which operates batchwise, but substantially continuously, for carrying out the method of the invention.

In the equipment, several smoke generation units 2 are mounted on an endless, horizontal conveyor, such as a chain conveyor. These units are boxes which have solid walls and are open at the top, the dimensions of said boxes being chosen in accordance with the desired generation of smoke. The cross-sectional dimensions may be, e.g., about 0.5×0.5 m. The dimension of height is not critical in any other respect except that it must be possible to place a sufficient fuel layer in the box. In view of the process of generation of smoke, a sufficient dimension of height is, e.g., about 150 mm.

The smoke generation units are arranged to move by means of a stepwise movement of the conveyor 1 alternatingly via a fuel filling station 3, a kindling station 4, a smoke generation station 5, and an emptying station 6.

At the filling station 3, a suitable quantity of fuel is measured into the smoke generation unit from a silo 7, either by means of a compartment dosimeter 8 or by using a leveling doctor, which scrapes any extra fuel out of the smoke generation unit. As the next stage, the smoke generation unit proceeds to the kindling station 4. Here the surface of the fuel is kindled by means of a flame, favorably a gas flame 9, over the entire surface of the smoke generation unit. After the fuel has caught fire all over, the kindling flame is extinguished. The smoke generation unit is kept in the kindling station for a suitable period of time, during which time the fuel surface burns with an open flame and gradually forms the desired layer of coals on its surface.

The smoke formed during this time is passed by means of a separate flue 10 out of the equipment, i.e. this smoke is not used in the smoke-curing process. The process of burning of the kindling stage is observed so as to ascertain the formation of an adequate layer of coals. Quite a reliable indication of the formation of the desired layer of coals is a clearly increased formation of smoke. As a rule, this stage takes about 1 to 10 minutes of time. Thereinafter, as it has been noticed that a sufficient layer of coals, i.e. of a thickness of at least 0.5 mm, has been formed, the smoke generation unit can be shifted to the smoke generation stage 5. Abundant generation of smoke can be noticed in the smoke generation station, to some extent depending on the particle size of the fuel, for a period of about one hour, during which time a layer of coals has been formed on the fuel surface, the thickness of said layer of coals being, as a rule, within the range of 20 to 50 mm. True enough, in the case of a fuel that is to be classified as coarse, advantageous generation of smoke may, however, go on up to a thickness of the layer of coals amounting to about 100 mm, or even somewhat more.

After the burning has reached this stage, the smoke generation unit is removed from the smoke generation station and passed to the emptying station 6, wherein the coals and the unburnt fuel are removed.

The process runs through the above cycle batchwise, whereby, at the kindling stage, the situation of burning in the smoke generation station must be predicted in order to avoid interruptions in the generation of smoke. A deliberately periodic operation is also possible in order to supply the smoke as subsequent cycles following at certain time intervals.

The process can be controlled by means of a suitable automatic system or, alternatively, manually.

If, with the fuel that is being used, it has been noticed that an advantageous maximum thickness of the layer of coals is, e.g., 50 mm, the smoke generation unit 2 should be filled with fuel at the filling stage 3 preferably, e.g., up to a layer thickness of about 70 to 80 mm. The layer of fuel that remains on the bottom of the smoke generation unit after the smoke generation stage has a significance of its own as the layer that receives any tar fractions that may be distilled in the smoke generation stage.

The combustion air required by the smoke generation stage is passed to the fuel surface by means of a blower equipment 11, the quantity of air supplied by said equipment being preferably adjustable. The air must be dosed uniformly over the fuel surface. It is also possible to use natural draught in the supply of combustion air, which said natural draught should also be adjustable.

The smoke generation unit may also include a heat exchanger 12, which may be a cooler or a heater. A cooler can be used for condensation of any impurities that may be contained in the smoke gas. In the case of hot-smoking, the temperature of the smoke gases can be raised by means of a heat exchanger.

The ashes are shaken off at the emptying stage of the smoke generation units into a suitable collecting vessel 13 or onto a removing conveyor.

An alternative equipment for carrying out the invention is shown in the accompanying FIG. 2. This equipment operates in principle continuously even though its operation involves aspects that require periodization, which will be explained below.

The equipment comprises a fire chamber 15, a mantle 14 that surrounds the top portion of the fire chamber, means 16 for the supply of the fuel to the bottom portion of the fire chamber, means 17 for the supply of combustion air substantially to the mouth of the fire chamber, means 18 for passing the smoke into the smoke oven, means 18' and 18" for arranging by-pass flow of smoke, as well as means 19 for the removal of the combustion residue out of the equipment.

The mantle 14 of the equipment may have a relatively simple construction, in principle a metal sheet construction, for during the operation of the equipment it is not subjected to substantial thermal strains. On the contrary, the fire chamber 15 itself is more demanding in respect of the construction. On the basis of the circumstances explained above, it is preferably manufactured as of a circular section, whereat its bottom portion 15' may consist of a metal tube. On the contrary, in the range 15" of the burning zone proper, the fire chamber should be made thermally insulated, or it may be made of a material of poor thermal conductivity, e.g. of a ceramic material.

The fuel is passed to the bottom portion of the fire chamber by means of a suitable feeding equipment, such as a screw feeder 16. For the supply of the combustion air to the mouth of the fire chamber, the equipment may be provided with a separate pipe system 17, or alternatively the combustion air may be passed through appropriately dimensioned openings made into the mantle 14. Advantageously, the fire chamber should be provided with temperature detectors 20 placed substantially at the level of the desired burning zone.

The equipment of the sort concerned can be operated as follows. Appropriately finely divided wood material is fed by means of the screw feeder 16 into the fire chamber 15 until the fire chamber is full to the brim. Hereupon the fuel face is kindled all over, and an amount of air sufficient for burning is passed to the fuel. The smoke gas developed at this stage is passed out of the equipment, e.g. through a branch pipe 18' of the flue 18, i.e. the smoke gas of this kindling stage is not utilized. After the burning has been stabilized, which can be noticed quite reliably, e.g., on the basis of the quantity of smoke that is generated, the smoke gas is passed to smoke-curing, and the burning is allowed to go on for a certain time (1 to 10 min) estimated in advance, it having been noticed that the fire front proceeds during said period of time in the direction of depth over said about 30 to 50 mm, in some cases about 100 mm. After this, the flue-gas by-pass duct 18' is opened and the feeder equipment 16 is started momentarily. The new fuel entering into the fire chamber pushes the fuel column upwards, whereat the layer of ashes in the lateral areas of the fire chamber falls off from the mouth of the fire chamber onto the bottom of the mantle 14 and can be removed by means of the ash-removing means 19.

The period of supply of fresh fuel unavoidably causes a stirring effect in the layer of coals placed on the burning layer, so that during the stirring and during the subsequent period of stabilization of burning the smoke must be passed out of the smoke-curing equipment through the by-pass duct 18'. After the burning has been stabilized, the smoke can again be passed to smoke-curing. The procedure is repeated a few times, whereby a suitable hill has been formed at the mouth of the fire chamber, the surface layer of said hill being discharged substantially all over each time when fresh fuel is supplied. In principle, by means of the equipment a continuous process of smoke generation is provided, even though the stirring and the subsequent stabilization of the burning cause their breaks in the generation of usable smoke.

Said period of supply of fresh fuel should perhaps preferably be continued, at least in some periods of supply, long enough so that a fresh fuel layer is obtained in the burning equipment up to the surface. In such a case, the tar fraction can also be removed out of the equipment, which said fraction is distilled out of the fuel ahead of the burning front and is concentrated in the fuel placed below. After such a period of supply, the hill must be kindled again in the way described above.

Differing from the above, the equipment may also be provided with a suitable doctor, which removes the layer of ashes from the mouth of the fire chamber after each period of supply. In such a case, in the utilization of the smoke, the above by-passing should also be applied.

The operation of the equipment can be controlled relatively reliably manually by observing the generation of smoke and by regulating the supply of fuel accordingly. The operation can also be made automatic in a relatively simple way by placing temperature detectors 20 in the burning zone and its direct proximity, whereat, on the basis of the information supplied by said detectors 20, it is possible to conclude the lengths and frequencies of the required fuel supply periods by means of a simple logic equipment so as to make the burning zone remain at the desired distance from the mouth of the fire chamber.

In view of the carrying out of the method and the operation of the equipment, it is also essential that the fuel used is chosen correctly. Usable fuel is, e.g., alder, which is used traditionally for smoke-curing. Other usable fuels are beech and juniper, and in some cases also peat. Mixtures of the above fuels can, of course, also be used, above all when different flavors are aimed at. As a suitable moisture content of wood fuel can be defined "air dry". A fuel dryer than that can also be used, but the burning of a fuel of a higher moisture content may cause difficulties.

It has also been noticed that the granularity of the fuel has its effect in the control of the burning process, and as a general definition for the granularity it is possible to use the expression sawdust. On the basis of screening tests, it has been noticed that the major part of the particles in a well operative fuel are within the range of 125 to 2000 $\mu$m.

What is claimed is:

1. A method for smoke-curing a food comprising burning a finely divided material which generates smoke during charring to form a layer of coals on the surface of the finely divided material; forming a burning zone which progresses through the finely divided material by passing a combustion air through said layer of coals in a counterflow direction to the flow of smoke generated by the burning of the finely divided material; contacting the food to be smoke-cured with the smoke obtained from the burning finely divided material when said layer of coals formed on the surface of the finely divided material has a thickness of about 0.05 to 100 nm.

2. The method of claim 1 wherein the food to be smoke-cured is contacted with the smoke obtained from the burning finely divided material when said layer of coals formed on the surface of the finely divided material has a thickness of 2 to 50 mm.

* * * * *

UNITED STATES PATENT AND TRADEMARK OFFICE
CERTIFICATE OF CORRECTION

PATENT NO. : 5,013,567

DATED : May 7, 1991

INVENTOR(S) : Karl-Jan GOVENIUS

It is certified that error appears in the above-identified patent and that said Letters Patent is hereby corrected as shown below:

On the cover page, Item [86], the §371 and §102(e) Dates of "October 10, 1988" should read -- October 10, 1989 --.

Signed and Sealed this

Twenty-ninth Day of September, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,013,567

DATED : May 7, 1991

INVENTOR(S) : Karl-Jan GOVENIUS

It is certified that error appears in the above-identified patent and that said Letters Patent is hereby corrected as shown below:

Col. 10,
Claim 1, line 59, "0.05 to 100 nm" should read --0.05 to 100 mm--.

Signed and Sealed this

Twenty-second Day of December, 1992

Attest:

DOUGLAS B. COMER

*Attesting Officer*        *Acting Commissioner of Patents and Trademarks*